(12) United States Patent
Gandhi

(10) Patent No.: US 6,172,540 B1
(45) Date of Patent: Jan. 9, 2001

(54) APPARATUS FOR FAST LOGIC TRANSFER OF DATA ACROSS ASYNCHRONOUS CLOCK DOMAINS

(75) Inventor: Jayanti Gandhi, Tempe, AZ (US)

(73) Assignee: Intel Corporation, Santa Clara, CA (US)

( * ) Notice: Under 35 U.S.C. 154(b), the term of this patent shall be extended for 0 days.

(21) Appl. No.: 09/374,798

(22) Filed: Aug. 16, 1999

(51) Int. Cl.$^7$ ....................................................... H03L 7/00
(52) U.S. Cl. ............................................. 327/145; 327/144
(58) Field of Search ..................................... 327/141, 144, 327/145, 154, 202; 375/355, 356, 365, 370

(56) References Cited

U.S. PATENT DOCUMENTS

| | | | | |
|---|---|---|---|---|
| 5,905,391 | * | 5/1999 | Mooney | 327/141 |
| 5,974,102 | * | 10/1999 | Eo et al. | 327/144 |
| 5,987,083 | * | 11/1999 | Matsushita et al. | 375/356 |
| 6,087,867 | * | 7/2000 | Holm | 327/144 |

* cited by examiner

*Primary Examiner*—Toan Tran
(74) *Attorney, Agent, or Firm*—Blakely, Sokoloff, Taylor & Zafman LLP

(57) ABSTRACT

The present invention provides a circuit to transfer data from a first clocked domain to a second clocked domain. The circuit includes a first latch clocked by a first clock signal and a second latch clocked by a second clock signal that is faster than the first clock signal. The circuit further includes a clock enabling circuit to receive the second clock signal and the signal indicating that a transition of the first clock has occurred and to provide the second clock signal to the second latch after the transition of the first clock signal. In another embodiment, the present invention provides a circuit to transfer data from a first clock domain to a second clock domain that is asynchronous with respect to the first clock domain. The circuit includes a first latch sequenced by a first clock signal that has a first frequency and the second latch sequenced by a second clock signal that has a second frequency substantially lower than the first frequency. The circuit also includes a clock enabling circuit to receive the first clock signal and the signal indicating occurrence of a triggering edge of a second clock signal. The clock enabling circuit provides the first clock signal to the first latch when the signal indicates occurrence of the triggering edge of the second clock signal.

10 Claims, 4 Drawing Sheets

APPARATUS FOR FAST LOGIC TRANSFER OF DATA ACROSS ASYNCHRONOUS CLOCK DOMAINS

BACKGROUND OF THE INVENTION

I. Field of the Invention

The present invention relates to electronic circuits. More specifically, the present invention relates to logic data transfer across asynchronous clock domains.

II. Background Information

Sequential logic circuits are comprised of memory elements, such as flip flops or registers, that maintain state information, i.e., that store a value and combinational logic. The output of such memory element is a function of its inputs and of the contents, or present state of the memory element, as well. Sequential logic circuits may be characterized as either asynchronized (unclocked) or synchronized (clocked). While inputs to an asynchronous sequential logic circuit may change at any time, the inputs to a synchronous logic circuit may change the state at specific times as defined by clocking or timing methodology. As it is well-known to those having ordinary skill in the art, clocked or synchronous sequential circuits are triggered, i.e., they change state, according to clock policies input to the circuit. As the output of a memory element is a signal representing the current state of the memory element, the output of a clock sequential circuit is updated in synchronization with clock policies provided as input to the circuit.

A common timing methodology in the art is edge-trigger clocking. According to this scheme, a memory element is triggered, i.e., the one or more inputs to the memory element are sampled, during either the leading (rising) or trailing (falling) edge of a clock signal supplied as input to the memory element. For example, a trailing edge trigger flip flop changes state on the trailing edge of a clock signal in transition and maintains that state for one complete clock cycle, until another trailing edge of a clock signal is detected.

When a memory element such as a flip-flop or register is triggered by the edge of a clock signal, the input signals to the memory element need to be stable at that time. If one or more input signals to a memory element are changing state at a time at which the clock edge is received, the state and thus the output of the memory element may be unstable. When one or more inputs of a memory element are in transition at the time the memory element is triggered, thereby causing the state and output to be indeterminate, the memory element is in a metastable state. Metastability may manifest itself in many ways, including, but not limited to, an unpredictable output logic value, oscillation of the output value, indeterminate voltage level of the output representing an illegitimate logic value somewhere between a high or low logic value, and an indeterminate period of instability.

To avoid metastability, fundamental timing requirements are prescribed. One such timing requirement is "set up time" (hereinafter referred to as "$T_{setup}$") which defines that period of time immediately prior to receiving a clock edge during which inputs to the memory element need to be stable and valid. Another fundamental timing requirement, "hold time" (hereinafter referred to as "$T_{hold}$"), defines that period of time immediately following reception of a clock edge during which inputs to the memory element must be stable and valid. Metastability is the resulting behavior of a synchronous element if the fundamental timing requirements are not met. Thus, each input to a synchronous element needs to be stable, i.e., a voltage level representing a valid logic value is to be maintained so that a single valid output logic value is detected for a window of time equal to $T_{setup}+T_{hold}$ to avoid metastability.

When coupling two external devices together, such as digital computer and an input/output device, it may not be possible or advantageous for all the logic circuitry involved to derive a clock source from the same clock. In such a case, a plurality of clocks, each providing a clock signal to an exclusive region of the logic circuitry of a device or each providing a clock signal to the logic circuitry of separate external devices, may be employed. In such circumstances, multiple clock domains may exist. Components of a synchronous logic circuit which derive their clock source from the same clock are in the same clock domain. By contrast, components of synchronous logic circuits which derive their clock source from different independent clocks are in different clock domains.

Signals between a first synchronous logic circuit in a first clock domain and a second synchronous logic circuit in a second clock domain are transferred asynchronously. A signal transferred from the first synchronous logic circuit may be in transition at the same time a clock signal for the second synchronized logic circuit triggers the memory element that receives as input the signal from the first synchronous logic circuit. To prevent an asynchronous signal arriving at the second logic circuit from being in transition during triggering of the second logic circuit, the first and second synchronous logic circuits use control signals in the form of a two-way handshake to synchronize the asynchronously transferred signal.

However, the method of asynchronously transferring data using two-way handshake control signals limits the rate at which data may be transferred between synchronized logic circuits having different clock domains. The logic transfer across asynchronous clock domain suffers from heavy loss of performance as for each transfer across the clock domains a logic loop of change request and acknowledgement signals is generated. Consequently, each transfer incurs many additional clock cycles of performance loss. It is desired to provide a better method and apparatus for asynchronously transferring data between synchronous sequential logic circuits belonging to different clock domains.

SUMMARY OF THE INVENTION

In one embodiment, the present invention provides a circuit to transfer data from a first clock domain to a second clock domain asynchronous with respect to the first clock domain. The circuit includes a first latch sequenced by a first clock signal that has a first frequency. The circuit also includes a second latch coupled to the first latch. The second latch is sequenced by a second clock signal that has a second frequency. The second frequency is substantially greater than the first frequency. The circuit further includes a clock enabling circuit to receive the second clock signal and a signal indicating occurrence of a triggering edge of the first clock signal and to provide the second clock signal to the second latch when the signal indicates occurrence of the triggering edge of the first clock signal.

In another embodiment, the present invention provides a circuit to transfer data from a first clock domain to a second clock domain that is asynchronous with respect to the first clock domain. The circuit includes a first latch sequenced by a first clock signal that has a first frequency and the second latch sequenced by a second clock signal that has a second frequency substantially lower than the first frequency. The circuit also includes a clock enabling circuit to receive the first clock signal and the signal indicating occurrence of a triggering edge of a second clock signal. The clock enabling circuit provides the first clock signal to the first latch when the signal indicates occurrence of the triggering edge of the second clock signal.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
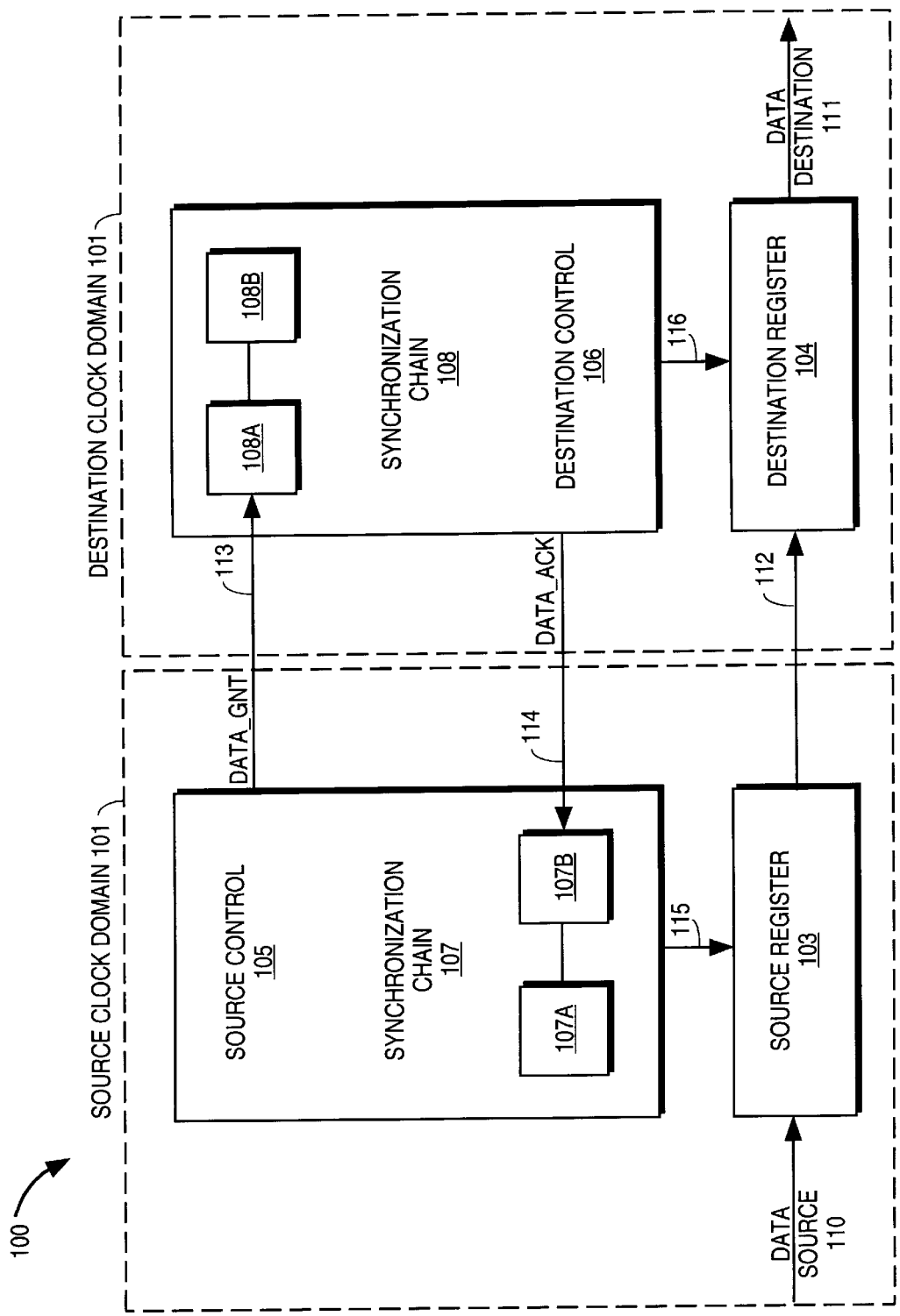
FIG. 1 is a block diagram of a circuit that uses a two-way handshake method of asynchronous transfer between first synchronous logic circuit and a second synchronous logic circuit.

FIG. 1 illustrates a logic circuit 100 used to implement a conventional two-way handshake method of asynchronous transfer between a first synchronous logic circuit and a second synchronous logic circuit. Circuit 100 includes two separate synchronous sequential logic circuits 101 and 102, that have their own clocks. The circuit in source clock domain 101 is comprised of source register 103 and source control logic 105, which comprises a finite state machine and two flip-flops, 107a and 107b (hereinafter collectively referred to as a "synchronizer chain 107"). The circuit in destination clock domain 102 is comprised of destination register 104, and destination control logic 106, which comprises a finite state machine and two flip-flops, 108a and 108b (hereinafter collectively referred to as "synchronizer chain 108"). In this example, data is transferred from source register 103 to destination register 104. Source control logic 105 and destination control logic 106 control the sequence of operations and synchronize the handshake signals DATA_GNT 113 and DATRA_ACK 114 by way of synchronizer chain 107 and synchronizer chain 108, respectively. In this way, source control logic 105 and destination control logic 106 cooperate to asynchronously transfer data from the source register 103 to the destination register 104.

A synchronizer chain is commonly constructed of a plurality of flip-flop coupled in sequence, wherein each flip-flop may be referred to as a stage in the synchronizer chain. For example, synchronizer chain 107 is comprised of two flip-flops in sequence, the output of flip-flop 107a coupled to the input of flip-flop 107b. Although in this example the synchronization chain has a depth of two, that is, two flip-flops coupled in sequence, a synchronization chain may have any depth. As metastability may have occurred earlier in the synchronization chain, the logical value output at the end of the synchronization chain may not reflect the original state of the signal input to the synchronization chain.

Because the destination register 104 by itself does not know when source register 104 has data available for transfer over line 112, it is necessary that a control signal furnishes this information. When asserted, the data grant (DATA_GNT 113) signal sent by source control logic 105 informs destination control logic 106 when source register 103 has data available and is ready to transmit. A control signal furnishes source control logic 105 information about when data has been accepted by destination register 104. The data acknowledge (DATA_ACK 114) signal sent by destination control logic 106, is asserted to inform source control logic 105 that destination register 104 has received the data from source register 103 by way of line 112. Source control logic 105 assures that the contents of source register 103 do not change after DATA_GNT 113 is asserted until it detects the assertion of DATA_ACK 114.

Due to the time required for flip-flops 108a and 108b to synchronize DATA_GNT 113 and flip-flops 107a and 107b to synchronize DATA_ACK 114, a significant amount of delay is incurred to complete a two-way handshake using control signals DATA_GNT 113 and DATA_ACK 114. The present invention provides in one embodiment thereof a circuit to transfer data that does away with synchronization of the two-way handshake control signals.

Figure 2:
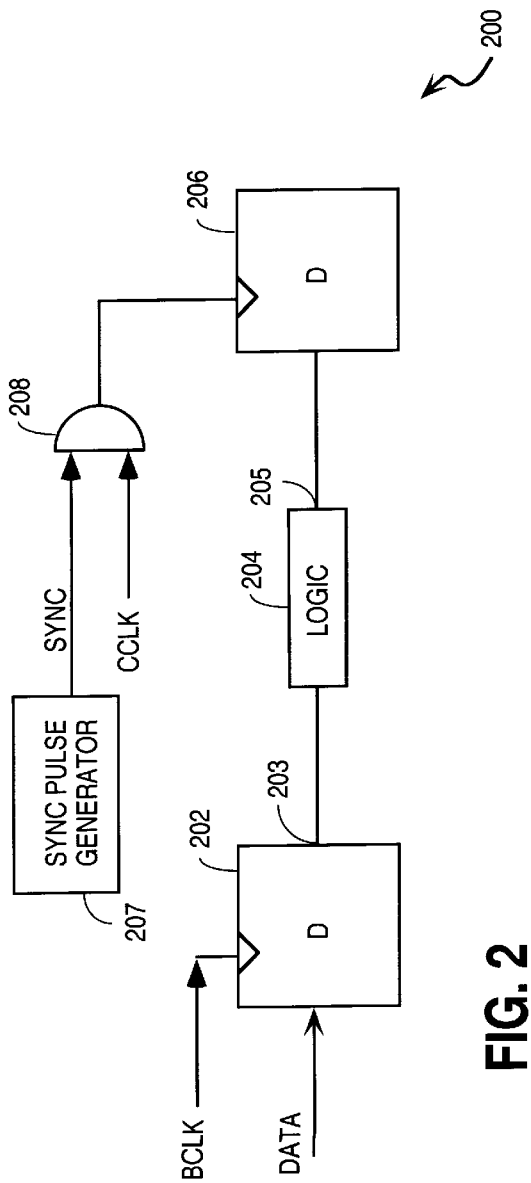
FIG. 2 illustrates one embodiment of a circuit for transferring logic data from a first clock domain to a second clock domain asynchronous with respect to the first clock domain where the second clock domain uses a second clock that has a frequency substantially higher than the frequency of the first clock corresponding to the first clock domain.

FIG. 2 illustrates one embodiment of a circuit 200 for transferring logic data from a first clock domain to a second clock domain asynchronous with respect to the first clock domain where the second clock domain uses a second clock (CCLK) that has a frequency substantially higher than the frequency of the first clock (BCLK) of the first clock domain. In one embodiment according to the present invention, the frequency of CCLK is at least three times higher than the frequency of BCLK but the present invention is not limited in this respect to such ratio of frequency. Circuit 200 includes a first latch 202 clocked by the first clock BCLK. In one embodiment, the first latch 202 may be a D flip-flop. A data signal latched by the flip-flop 202 is output to a logic circuit 204 that uses the data signal to generate a signal at an output port 205 thereof. The signal generated at output port 205 of 204 is provided to an input of a second latch 206 that is sequenced by the second clock signal CCLK. Circuit 200 further includes a clock enabling circuit 208 that receives at one input thereof a Sync (pulse) signal generated by a Sync pulse generator 207, and at the second input port thereof the second clock signal CCLK. The Sync pulse generator detects the rising edge for every BCLK period and in response generates a Sync pulse. In one embodiment the width of the Sync pulse is substantially equal to the width of the CCLK signal. In one embodiment the clock enabling circuit 208 includes an AND gate that is transparent to the CCLK signal when the Sync pulse is asserted to logic 1.

Figure 3:
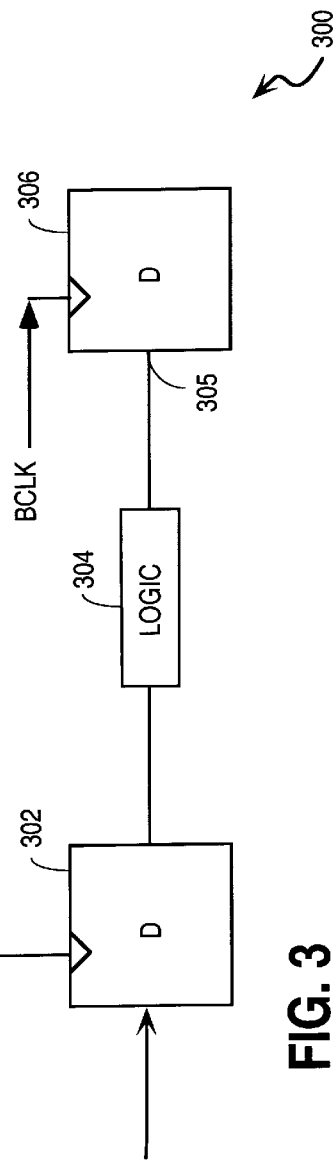
FIG. 3 illustrates a circuit to transfer logic data from a first clock domain to a second clock domain where the first clock domain uses a first clock signal that has a frequency that is faster than the frequency of a second clock signal corresponding to the second clock domain.

FIG. 3 illustrates a circuit to transfer logic data from a first clock domain to a second clock domain where the first clock domain uses a first clock signal (CCLK) that has a frequency that is faster than the frequency of a second clock signal (BCLK) corresponding to the second clock domain. Circuit 300 includes first and second latches 302 and 306. First latch 302 is coupled at a clock input port to a clock enabling circuit 308. In one embodiment, circuit 308 is implemented by way of an AND gate. Circuit 308 receives at one input thereof the Sync pulse from Sync pulse generator circuit 307 and at a second input port thereof the first clock signal CCLK. The Sync pulse generator 307 may be the same Sync pulse generator 207 shown in FIG. 2. The clock enabling circuit 308 works in the same way as the clock enabling circuit 208 explained in connection with the description of FIG. 2.

New data is latched by latch 302 when the Sync pulse is asserted and the CCLK transitions from low to high. This allows second latch 306 to latch the data present at the input port thereof while that data is stable, before new data is latched by latch 302, processed, and transferred by logic circuit 304 to the input port 305 of latch 306.

Figure 4:
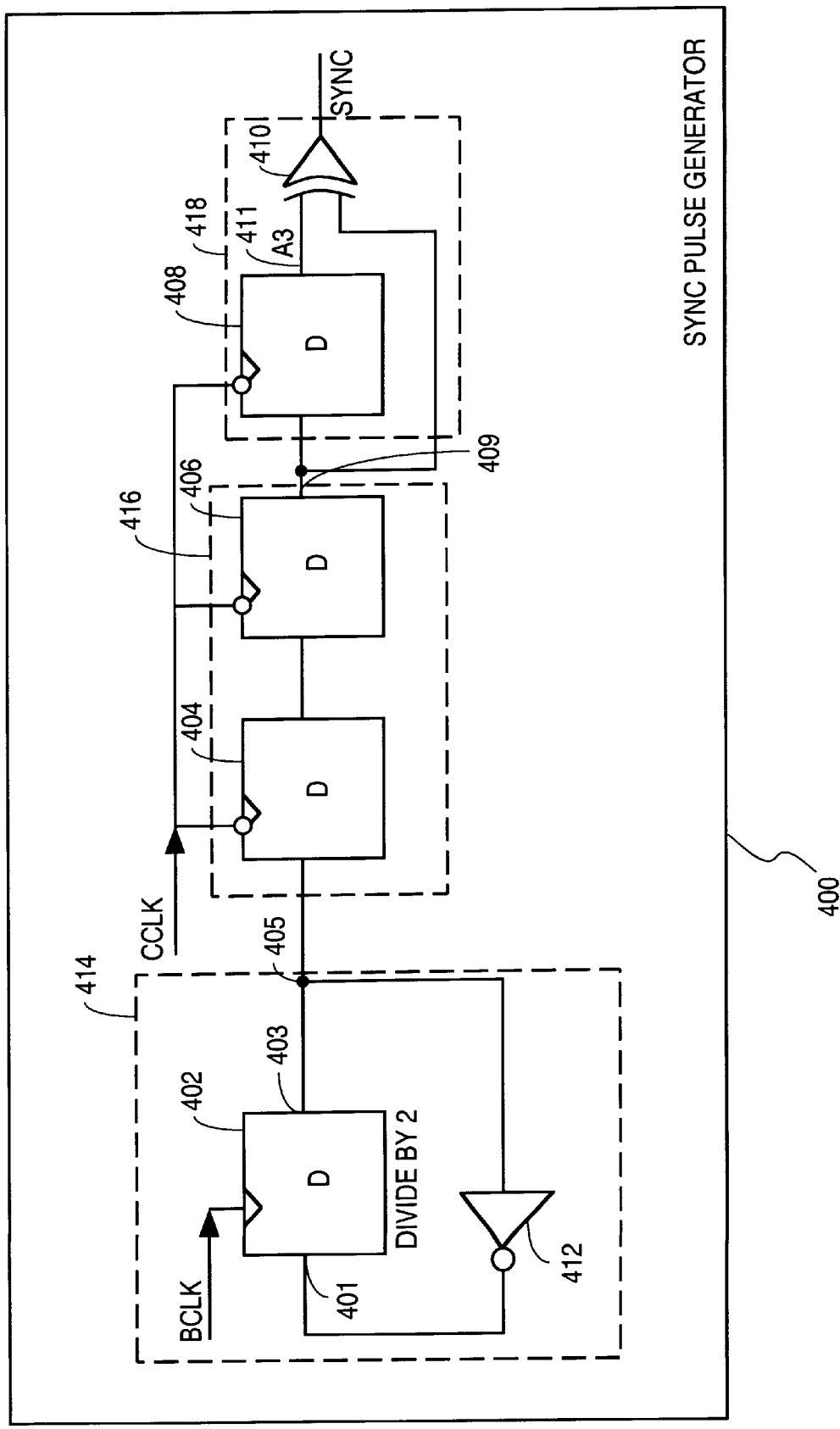
FIG. 4 illustrates a circuit that produces Sync pulses according to one embodiment of the present invention.

FIG. 4 illustrates an embodiment of a Sync pulse generator circuit 400 that produces Sync pulses. The Sync pulse generator circuit 400 is the same circuit as the Sync pulse generator Circuits 207 and 307 shown in FIGS. 2 and 3 respectively. Circuit 400 operates in connection with first and second clock domains that are sequenced by first and second clocks BCLK and CCLK, respectively, discussed earlier in this section. In one embodiment according to the present invention described herein, CCLK has a frequency that is at least three times higher than the frequency of BCLK.

Circuit 400 includes a frequency divider circuit 414 that divides by two the frequency of the first clock BCLK. Circuit 414 includes inverter circuit 412 coupled to output port 403 of latch 402. For purposes of explanation assume that at a given moment in time the input signal to latch 402 is at zero logic. Upon the rising edge of the BCLK signal, latch 402 latches therein the zero logic signal presented at its input. Inverter 412 inverts the zero logic signal providing a logic I signal to the input port 401 of latch circuit 402. Upon the next rising edge of BCLK, the logic value of the signal at output port 403 changes to 1. The logic 1 signal at output port 403 is inverted by inverter 412 to generate a zero logic to the input port 401 of latch 402. Upon the next rising edge of the signal BCLK latch 402 latches therein the 0 logic and so on. As the signal at output port 403 is either a zero or a 1 for a whole clock cycle BCLK, the frequency of the signal at output port 403 is half the frequency of the signal BCLK,.

The signal seen at output port 403 is then passed through metastable clearing circuit 416 (shown within dotted lines). Metastable clearing circuit 416 includes flip-flops 404 and 406 that may be conventional metastable immune D-type flip-flops. Note that these flip-flops are sequenced by the "faster" signal CCLK and are active upon the falling edge transition of the CCLK signal. Metastable immune flip-flops are well-known in the art. The signal provided to the output port 409 of circuit 416 is a signal substantially devoid of metastabilities. This signal is further provided to an input port of a Sync pulse generator that includes latch 408 sequenced by CCLK. The signal at the output port 409 is also provided to an input port of XOR gate 410. The XOR gate 410 receives at a second input port thereof a signal from flip-flop 408. The XOR gate 410 generates at an output port thereof a Sync pulse set to logic 1 when the two signals at the input ports of XOR gate 110 are set to different logic values.

Figure 5:
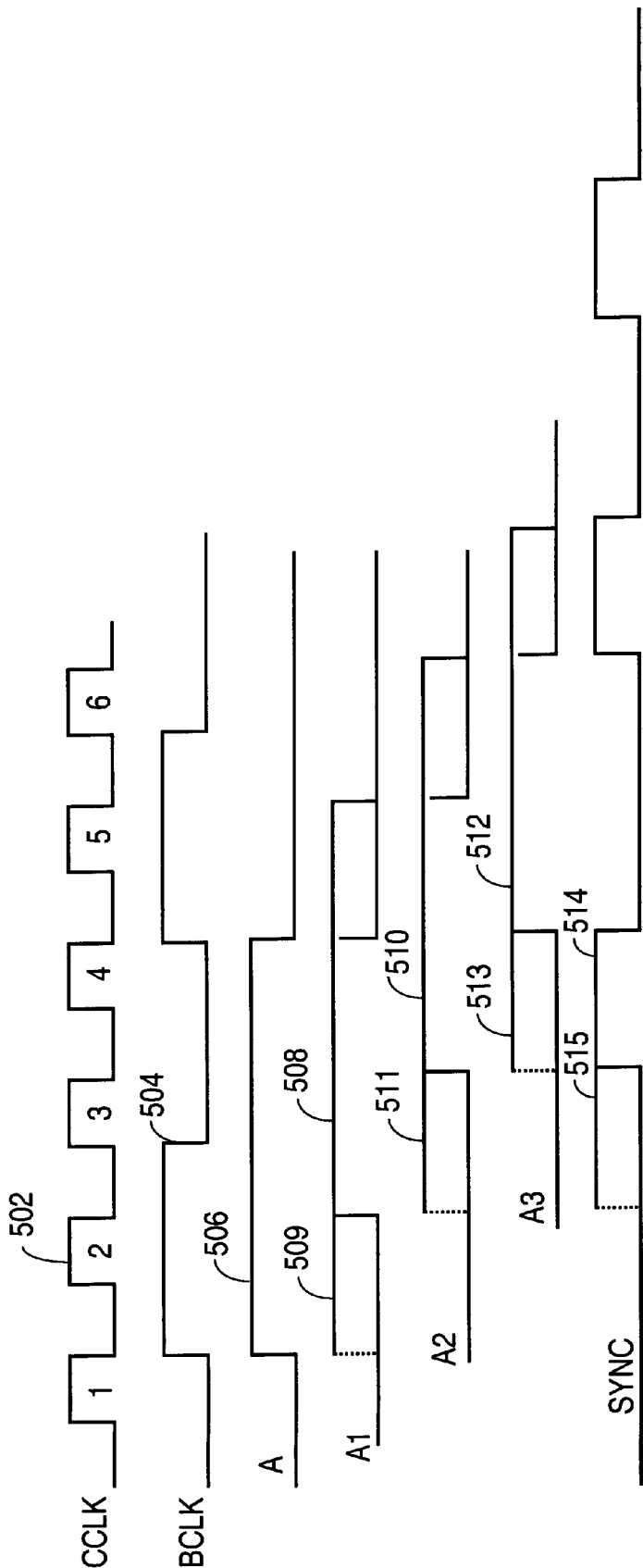
FIG. 5 illustrates waveform diagrams in connection with the signals used and produced by the circuit of FIG. 4.

FIG. 5 illustrates waveform diagrams in connection with the signals used and produced by the circuit of FIG. 4.

Waveform 502 represents the "faster" clock signal CCLK. The waveform 504 represents the "slower" clock signal BCLK, which in one embodiment of the present invention is at least three times "slower" than the CCLK signal. Signal 506 is the signal generated at output port 403 of latch 402 of FIG. 4. Note that the frequency of the signal represented by waveform 506 is substantially equal to half the frequency of the BCLK signal.

Waveform 508 represents the signal generated at the output port of flip-flop 404. Note that this signal may be dephased by one CCLK cycle relative to waveform 506. The dashed line 509, shown in connection with waveform 508, indicates that there is uncertainty with respect to the rising edge of waveform 508. The uncertainty is due to asynchronous events. For example, if the signal at the output port 403 transitions from zero to 1 very shortly before the falling edge of the CCLK signal, the signal at the output port of latch 404 transitions very close in time to the transition of the signal at the output port 403. In this case, waveform's 508 transition from 0 to 1 is closer to the transition of waveform 506 from 0 to 1. However, if the signal at the output port 403 transitions at the same time or shortly after the falling edge of the CCLK signal, it may take approximately one CCLK cycle for a next falling edge of the CCLK signal before data at the input port of flip-flop 404 is latched by this flip-flop.

Waveform 510 represents the signal at the output port 409 of flip-flop 406. Note that there is also an uncertainty region 511 in connection with waveform 510. Waveform 512 represents the signal at the output port 411 of flip-flop 408. The Sync pulse 514 generated at the output port of the XOR gate 410 is shown with the uncertainty portion 515. This Sync pulse changes state approximately one or two clock cycles after the assertion of the BCLK signal.

In the previous detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A circuit to transfer data from a first clock domain to a second clock domain asynchronous with respect to the first clock domain, the circuit comprising:
    a first latch sequenced by a first clock signal that has a first frequency;
    a second latch, coupled to the first latch, sequenced by a second clock signal that has a second frequency that is substantially greater than the first frequency; and
    clock enabling circuit to receive the second clock signal and a signal indicating occurrence of a triggering edge of the first clock signal and to provide the second clock signal to the second latch when the signal indicates occurrence of a triggering edge of the first clock signal.

2. The circuit of claim 1 wherein the second frequency is at least 3 times greater than the first frequency.

3. The circuit of claim 1 wherein the clock enabling circuit includes an AND gate.

4. The circuit of claim 1 further including a Sync pulse generator to generate the signal indicating the triggering edge of the first clock signal, the Sync pulse generator being coupled to the clock enabling circuit.

5. A circuit to transfer from a first clock domain to a second clock domain asynchronous with respect to the first clock domain, the circuit comprising:
    a first latch sequenced by a first clock signal that has a first frequency;

a second latch sequenced by a second clock signal that has a second frequency substantially lower than the first frequency; and a clock enabling circuit to receive the first clock signal and a signal indicating occurrence of a triggering edge of the second clock signal and to provide the first clock signal to the first latch when the signal indicates occurrence of a triggering edge of the second clock signal.

6. The circuit of claim 5, wherein the first frequency is at least 3 times greater than the second frequency.

7. The circuit of claim 5 wherein the clock enabling circuit includes an AND gate.

8. The circuit of claim 5 further including a Sync pulse generator to generate the signal indicating the triggering edge of the second clock signal, the Sync pulse generator being coupled to the clock enable circuit.

9. A circuit to transfer data from a first clock domain to a second clock domain-asynchronous with respect to the first clock domain, the circuit comprising:

a first latch sequenced by a first clock signal that has a first frequency;

a second latch, coupled to the first latch, sequenced by a second clock signal that has a second frequency that is substantially greater than the first frequency;

clock enabling circuit to receive the second clock signal and a signal indicating occurrence of a triggering edge of the first clock signal and to provide the second clock signal to the second latch when the signal indicates occurrence of a triggering edge of the first clock signal;

a Sync pulse generator to generate the signal indicating the triggering edge of the first clock signal.

10. A circuit to transfer from a first clock domain to a second clock domain asynchronous with respect to the first clock domain, the circuit comprising:

a first latch sequenced by a first clock signal that has a first frequency;

a second latch sequenced by a second clock signal that has a second frequency substantially lower than the first frequency;

a clock enabling circuit to receive the first clock signal and a signal indicating occurrence of a triggering edge of the second clock signal and to provide the first clock signal to the first latch when the signal indicates occurrence of a triggering edge of the second clock signal; and a Sync pulse generator to generate the signal indicating the triggering edge of the second clock signal.

* * * * *

UNITED STATES PATENT AND TRADEMARK OFFICE
CERTIFICATE OF CORRECTION

PATENT NO. : 6,172,540 B1
DATED : January 9, 2001
INVENTOR(S) : Gandhi

It is certified that error appears in the above-identified patent and that said Letters Patent is hereby corrected as shown below:

Column 5,
Line 39, after "logic", delete "I" and insert -- 1 --.

Signed and Sealed this

Twenty-sixth Day of March, 2002

Attest:

JAMES E. ROGAN
Attesting Officer  Director of the United States Patent and Trademark Office